US012764589B2

(12) United States Patent
Keating et al.

(10) Patent No.: US 12,764,589 B2
(45) Date of Patent: Oct. 13, 2026

(54) REFERENCE INFORMATION FOR REFERENCE SIGNAL TIME DIFFERENCE

(71) Applicant: Nokia Technologies Oy, Espoo (FI)

(72) Inventors: Ryan Keating, Naperville, IL (US); Hyun-Su Cha, Naperville, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 19/042,310

(22) Filed: Jan. 31, 2025

(65) Prior Publication Data

US 2025/0184799 A1 Jun. 5, 2025

Related U.S. Application Data

(63) Continuation of application No. PCT/EP2023/070026, filed on Jul. 19, 2023.
(Continued)

(51) Int. Cl.
*H04W 56/00* (2009.01)
*H04L 5/00* (2006.01)
(Continued)

(52) U.S. Cl.
CPC ........... *H04W 24/10* (2013.01); *H04L 5/0048* (2013.01); *H04W 56/0015* (2013.01); *H04W 64/00* (2013.01); *H04W 92/20* (2013.01)

(58) Field of Classification Search
None
See application file for complete search history.

(56) References Cited

U.S. PATENT DOCUMENTS

2016/0095080 A1* 3/2016 Khoryaev ............. G01S 5/0284
455/456.1
2022/0015057 A1 1/2022 Bao et al.
(Continued)

FOREIGN PATENT DOCUMENTS

JP 2025-526761 A 8/2025
KR 20240015355 A * 2/2024 ............ H04W 64/00
(Continued)

OTHER PUBLICATIONS

"3rd Generation Partnership Project; Technical Specification Group Radio Access Network; NR; Physical layer procedures for data (Release 17)", 3GPP TS 38.214, V17.2.0, Jun. 2022, pp. 1-229.
(Continued)

*Primary Examiner* — Maharishi V Khirodhar
(74) *Attorney, Agent, or Firm* — BURR & FORMAN LLP

(57) ABSTRACT

Disclosed is a method comprising selecting at least one user device from one or more candidate user devices as a reference for reference signal time difference, RSTD, measurement; measuring an RSTD between at least two reference signals, wherein the at least two reference signals comprise at least a sidelink positioning reference signal received from the at least one user device selected as the reference; and transmitting a report comprising at least one of: an identifier of the at least one user device selected as the reference for the RSTD measurement, an identifier of a resource associated with the sidelink positioning reference signal received from the at least one user device, synchronization source information indicating at least one synchronization source of the at least one user device, or a time stamp of the sidelink positioning reference signal received from the at least one user device.

19 Claims, 6 Drawing Sheets

Related U.S. Application Data

(60) Provisional application No. 63/371,098, filed on Aug. 11, 2022.

(51) Int. Cl.

| | |
|---|---|
| ***H04W 24/10*** | (2009.01) |
| ***H04W 64/00*** | (2009.01) |
| *H04W 92/20* | (2009.01) |

(56) References Cited

U.S. PATENT DOCUMENTS

| | | | | |
|---|---|---|---|---|
| 2022/0070712 | A1* | 3/2022 | Bao | G01S 5/0036 |
| 2022/0086794 | A1* | 3/2022 | Lee | G01S 5/10 |
| 2024/0012129 | A1* | 1/2024 | Duan | G01S 13/74 |
| 2024/0236615 | A1* | 7/2024 | Shreevastav | H04W 64/003 |
| 2024/0244570 | A1* | 7/2024 | Yerramalli | H04W 40/04 |

FOREIGN PATENT DOCUMENTS

| | | | |
|---|---|---|---|
| WO | 2021/232228 | A1 | 11/2021 |
| WO | 2022/029268 | A1 | 2/2022 |
| WO | 2022/034483 | A2 | 2/2022 |
| WO | 2022/150117 | A1 | 7/2022 |
| WO | 2024/033034 | A1 | 2/2024 |
| WO | 2024/033564 | A1 | 2/2024 |

OTHER PUBLICATIONS

"3rd Generation Partnership Project; Technical Specification Group Radio Access Network; LTE Positioning Protocol (LPP) (Release 17)", 3GPP TS 37.355, V17.0.0, Mar. 2022, pp. 1-340.

"3rd Generation Partnership Project; Technical Specification Group Radio Access Network; Study on scenarios and requirements of in-coverage, partial coverage, and out-of-coverage NR positioning use cases (Release 17)", 3GPP TR 38.845, V17.0.0, Sep. 2021, pp. 1-16.

"3rd Generation Partnership Project; Technical Specification Group Services and System Aspects; Service requirements for the 5G system; Stage 1 (Release 18)", 3GPP TS 22.261, V18.6.1, Jun. 2022, 114 pages.

"3rd Generation Partnership Project; Technical Specification Group Services and System Aspects; Service requirements for cyber physical control applications in vertical domains; Stage 1 (Release 18)", 3GPP TS 22.104, V18.3.0, Dec. 2021, pp. 1-101.

"Revised SID on Study on expanded and improved NR positioning", 3GPP TSG RAN Meeting #94e, RP-213588, Agenda Item: 8.6.1, Intel, Dec. 6-17, 2021, 5 pages.

"Msc-generator", Sourceforge, Retrieved on Jan. 27, 2025, Webpage available at : https://sourceforge.net/projects/msc-generator/.

"Summary of 7.2.8.4: Physical-layer procedures to support UE/gNB measurements", 3GPP TSG-RAN WG1 Meeting #100bis-e, R1-2002713, Agenda Item: 7.2.8.4, Qualcomm Incorporated, Apr. 20-30, 2020, pp. 1-35.

"Final Report of 3GPP TSG RAN WG1 #111 v1.0.0 (Toulouse, France, Nov. 14-18, 2022)", 3GPP TSG RAN WG1 Meeting #112, R1-2300001, MCC Support, Feb. 27-Mar. 3, 2023, pp. 1-221.

"Moderator Summary #1 on potential solutions for SL positioning", 3GPP TSG RAN WG1 #111, R1-2212758, Agenda item: 9.5.1.2, Qualcomm, Nov. 14-18, 2022, 79 pages.

"3rd Generation Partnership Project; Technical Specification Group Radio Access Network; Study on expanded and improved NR positioning; (Release 18)", 3GPP TR 38.859, V18.1.0, Jun. 2024, pp. 1-106.

"Moderator Summary #4 on potential solutions for SL positioning", 3GPP TSG RAN WG1 #111, R1-2212938, Agenda item: 9.5.1.2, Qualcomm, Nov. 14-18, 2022, 82 pages.

Invitation to Pay Additional Fees received for corresponding Patent Cooperation Treaty Application No. PCT/EP2023/070026, dated Nov. 2, 2023, 13 pages.

"Discussion on Sidelink Positioning", 3GPP RAN WG2 Meeting #119-e, R2-2207486, Agenda item: 8.2.2, InterDigital Inc, Aug. 17-29, 2022, 13 pages.

"Potential Solutions for Sidelink Positioning", 3GPP TSG RAN WG1 #109-e, R1-2205038, Agenda item: 9.5.1.3, Qualcomm Incorporated, May 9-20, 2022, 11 pages.

"Discussion on sidelink positioning", 3GPP TSG-RAN WG2 Meeting #119 electronic, R2-2207586, Agenda item: 8.2.2, ZTE, Aug. 17-29, 2022, 10 pages.

International Search Report and Written Opinion received for corresponding Patent Cooperation Treaty Application No. PCT/EP2023/070026, dated Jan. 2, 2024, 18 pages.

Office action received for corresponding European Patent Application No. 23745458.2, dated May 8, 2025, 6 pages.

Office action received for corresponding Australian Patent Application No. 2023322083, dated Nov. 21, 2025, 4 pages,.

Notice of Allowance received for corresponding Japanese Patent Application No. 2025-507570, dated Dec. 11, 2025, 2 pages of Notice of Allowance and no page of translation available.

Office action received for corresponding Canadian Patent Application No. 3264723, dated Feb. 23, 2026, 4 pages.

* cited by examiner

REFERENCE INFORMATION FOR REFERENCE SIGNAL TIME DIFFERENCE

CROSS REFERENCE

This application is a continuation of International Patent Application No. PCT/EP2023/070026, filed Jul. 19, 2023, entitled "Reference information for reference signal time difference", the contents of which are incorporated herein by reference in their entirety.

FIELD

The following example embodiments relate to wireless communication and to positioning.

BACKGROUND

Positioning technologies may be used to estimate a physical location of a device. It is desirable to improve the positioning accuracy in order to estimate the location of the device more accurately.

BRIEF DESCRIPTION

The scope of protection sought for various example embodiments is set out by the independent claims. The example embodiments and features, if any, described in this specification that do not fall under the scope of the independent claims are to be interpreted as examples useful for understanding various embodiments.

According to an aspect, there is provided an apparatus in a radio access network, the apparatus comprising at least one processor, and at least one memory storing instructions which, when executed by the at least one processor, cause the apparatus at least to: select at least one user device from one or more candidate user devices as a reference for reference signal time difference, RSTD, measurement; measure an RSTD between at least two reference signals, wherein the at least two reference signals comprise at least a sidelink positioning reference signal received from the at least one user device selected as the reference; and transmit, to a network element of a core network, a report comprising at least one of: an identifier of the at least one user device selected as the reference for the RSTD measurement, an identifier of a resource associated with the sidelink positioning reference signal received from the at least one user device, synchronization source information indicating at least one synchronization source of the at least one user device, or a time stamp of the sidelink positioning reference signal received from the at least one user device.

According to another aspect, there is provided an apparatus in a radio access network, the apparatus comprising: means for selecting at least one user device from one or more candidate user devices as a reference for reference signal time difference, RSTD, measurement; means for measuring an RSTD between at least two reference signals, wherein the at least two reference signals comprise at least a sidelink positioning reference signal received from the at least one user device selected as the reference; and means for transmitting, to a network element of a core network, a report comprising at least one of: an identifier of the at least one user device selected as the reference for the RSTD measurement, an identifier of a resource associated with the sidelink positioning reference signal received from the at least one user device, synchronization source information indicating at least one synchronization source of the at least one user device, or a time stamp of the sidelink positioning reference signal received from the at least one user device.

According to another aspect, there is provided a method comprising: selecting, by an apparatus in a radio access network, at least one user device from one or more candidate user devices as a reference for reference signal time difference, RSTD, measurement; measuring, by the apparatus, an RSTD between at least two reference signals, wherein the at least two reference signals comprise at least a sidelink positioning reference signal received from the at least one user device selected as the reference; and transmitting, by the apparatus, to a network element of a core network, a report comprising at least one of: an identifier of the at least one user device selected as the reference for the RSTD measurement, an identifier of a resource associated with the sidelink positioning reference signal received from the at least one user device, synchronization source information indicating at least one synchronization source of the at least one user device, or a time stamp of the sidelink positioning reference signal received from the at least one user device.

According to another aspect, there is provided a computer program comprising instructions which, when executed by an apparatus in a radio access network, cause the apparatus to perform at least the following: selecting at least one user device from one or more candidate user devices as a reference for reference signal time difference, RSTD, measurement; measuring an RSTD between at least two reference signals, wherein the at least two reference signals comprise at least a sidelink positioning reference signal received from the at least one user device selected as the reference; and transmitting, to a network element of a core network, a report comprising at least one of: an identifier of the at least one user device selected as the reference for the RSTD measurement, an identifier of a resource associated with the sidelink positioning reference signal received from the at least one user device, synchronization source information indicating at least one synchronization source of the at least one user device, or a time stamp of the sidelink positioning reference signal received from the at least one user device.

According to another aspect, there is provided a computer readable medium comprising program instructions which, when executed by an apparatus in a radio access network, cause the apparatus to perform at least the following: selecting at least one user device from one or more candidate user devices as a reference for reference signal time difference, RSTD, measurement; measuring an RSTD between at least two reference signals, wherein the at least two reference signals comprise at least a sidelink positioning reference signal received from the at least one user device selected as the reference; and transmitting, to a network element of a core network, a report comprising at least one of: an identifier of the at least one user device selected as the reference for the RSTD measurement, an identifier of a resource associated with the sidelink positioning reference signal received from the at least one user device, synchronization source information indicating at least one synchronization source of the at least one user device, or a time stamp of the sidelink positioning reference signal received from the at least one user device.

According to another aspect, there is provided a non-transitory computer readable medium comprising program instructions which, when executed by an apparatus in a radio access network, cause the apparatus to perform at least the following: selecting at least one user device from one or more candidate user devices as a reference for reference signal time difference, RSTD, measurement; measuring an RSTD between at least two reference signals, wherein the at least two reference signals comprise at least a sidelink positioning reference signal received from the at least one user device selected as the reference; and transmitting, to a network element of a core network, a report comprising at least one of: an identifier of the at least one user device selected as the reference for the RSTD measurement, an identifier of a resource associated with the sidelink positioning reference signal received from the at least one user device, synchronization source information indicating at least one synchronization source of the at least one user device, or a time stamp of the sidelink positioning reference signal received from the at least one user device.

According to an aspect, there is provided an apparatus in a core network, the apparatus comprising at least one processor, and at least one memory storing instructions which, when executed by the at least one processor, cause the apparatus at least to: receive, from a target user device, a report comprising at least one of: an identifier of at least one user device selected as a reference for measuring a reference signal time difference, RSTD, an identifier of a resource associated with a sidelink positioning reference signal used for measuring the RSTD, synchronization source information indicating at least one synchronization source of the at least one user device selected as the reference for measuring the RSTD, or a time stamp of the sidelink positioning reference signal used for measuring the RSTD; and estimate a location of the target user device based at least partly on the report.

According to another aspect, there is provided an apparatus in a core network, the apparatus comprising: means for receiving, from a target user device, a report comprising at least one of: an identifier of at least one user device selected as a reference for measuring a reference signal time difference, RSTD, an identifier of a resource associated with a sidelink positioning reference signal used for measuring the RSTD, synchronization source information indicating at least one synchronization source of the at least one user device selected as the reference for measuring the RSTD, or a time stamp of the sidelink positioning reference signal used for measuring the RSTD; and means for estimating a location of the target user device based at least partly on the report.

According to another aspect, there is provided a method comprising: receiving, by an apparatus in a core network, from a target user device, a report comprising at least one of: an identifier of at least one user device selected as a reference for measuring a reference signal time difference, RSTD, an identifier of a resource associated with a sidelink positioning reference signal used for measuring the RSTD, synchronization source information indicating at least one synchronization source of the at least one user device selected as the reference for measuring the RSTD, or a time stamp of the sidelink positioning reference signal used for measuring the RSTD; and estimating, by the apparatus, a location of the target user device based at least partly on the report.

According to another aspect, there is provided a computer program comprising instructions which, when executed by an apparatus in a core network, cause the apparatus to perform at least the following: receiving, from a target user device, a report comprising at least one of: an identifier of at least one user device selected as a reference for measuring a reference signal time difference, RSTD, an identifier of a resource associated with a sidelink positioning reference signal used for measuring the RSTD, synchronization source information indicating at least one synchronization source of the at least one user device selected as the reference for measuring the RSTD, or a time stamp of the sidelink positioning reference signal used for measuring the RSTD; and estimating a location of the target user device based at least partly on the report.

According to another aspect, there is provided a computer readable medium comprising program instructions which, when executed by an apparatus in a core network, cause the apparatus to perform at least the following: receiving, from a target user device, a report comprising at least one of: an identifier of at least one user device selected as a reference for measuring a reference signal time difference, RSTD, an identifier of a resource associated with a sidelink positioning reference signal used for measuring the RSTD, synchronization source information indicating at least one synchronization source of the at least one user device selected as the reference for measuring the RSTD, or a time stamp of the sidelink positioning reference signal used for measuring the RSTD; and estimating a location of the target user device based at least partly on the report.

According to another aspect, there is provided a non-transitory computer readable medium comprising program instructions which, when executed by an apparatus in a core network, cause the apparatus to perform at least the following: receiving, from a target user device, a report comprising at least one of: an identifier of at least one user device selected as a reference for measuring a reference signal time difference, RSTD, an identifier of a resource associated with a sidelink positioning reference signal used for measuring the RSTD, synchronization source information indicating at least one synchronization source of the at least one user device selected as the reference for measuring the RSTD, or a time stamp of the sidelink positioning reference signal used for measuring the RSTD; and estimating a location of the target user device based at least partly on the report.

According to an aspect, there is provided an apparatus in a radio access network, the apparatus comprising at least one processor, and at least one memory storing instructions which, when executed by the at least one processor, cause the apparatus at least to: receive, from a network element of a core network, a threshold value for a time difference between receiving a downlink positioning reference signal and transmitting a sidelink positioning reference signal; and transmit, to a target user device, the sidelink positioning reference signal based at least on the threshold value, wherein the time difference between receiving the downlink positioning reference signal and transmitting the sidelink positioning reference signal is less than the threshold value.

According to another aspect, there is provided an apparatus in a radio access network, the apparatus comprising: means for receiving, from a network element of a core network, a threshold value for a time difference between receiving a downlink positioning reference signal and transmitting a sidelink positioning reference signal; and means for transmitting, to a target user device, the sidelink positioning reference signal based at least on the threshold value, wherein the time difference between receiving the downlink positioning reference signal and transmitting the sidelink positioning reference signal is less than the threshold value.

According to another aspect, there is provided a method comprising: receiving, by an apparatus in a radio access network, from a network element of a core network, a threshold value for a time difference between receiving a downlink positioning reference signal and transmitting a sidelink positioning reference signal; and transmitting, by the apparatus, to a target user device, the sidelink positioning reference signal based at least on the threshold value, wherein the time difference between receiving the downlink positioning reference signal and transmitting the sidelink positioning reference signal is less than the threshold value.

According to another aspect, there is provided a computer program comprising instructions which, when executed by an apparatus in a radio access network, cause the apparatus to perform at least the following: receiving, from a network element of a core network, a threshold value for a time difference between receiving a downlink positioning reference signal and transmitting a sidelink positioning reference signal; and transmitting, to a target user device, the sidelink positioning reference signal based at least on the threshold value, wherein the time difference between receiving the downlink positioning reference signal and transmitting the sidelink positioning reference signal is less than the threshold value.

According to another aspect, there is provided a computer readable medium comprising program instructions which, when executed by an apparatus in a radio access network, cause the apparatus to perform at least the following: receiving, from a network element of a core network, a threshold value for a time difference between receiving a downlink positioning reference signal and transmitting a sidelink positioning reference signal; and transmitting, to a target user device, the sidelink positioning reference signal based at least on the threshold value, wherein the time difference between receiving the downlink positioning reference signal and transmitting the sidelink positioning reference signal is less than the threshold value.

According to another aspect, there is provided a non-transitory computer readable medium comprising program instructions which, when executed by an apparatus in a radio access network, cause the apparatus to perform at least the following: receiving, from a network element of a core network, a threshold value for a time difference between receiving a downlink positioning reference signal and transmitting a sidelink positioning reference signal; and transmitting, to a target user device, the sidelink positioning reference signal based at least on the threshold value, wherein the time difference between receiving the downlink positioning reference signal and transmitting the sidelink positioning reference signal is less than the threshold value.

LIST OF DRAWINGS

In the following, various example embodiments will be described in greater detail with reference to the accompanying drawings, in which FIG. 1 illustrates an example of a cellular communication network;

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different example embodiments will be described using, as an example of an access architecture to which the example embodiments may be applied, a radio access architecture based on long term evolution advanced (LTE Advanced, LTE-A), new radio (NR, 5G), beyond 5G, or sixth generation (6G) without restricting the example embodiments to such an architecture, however. It is obvious for a person skilled in the art that the example embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
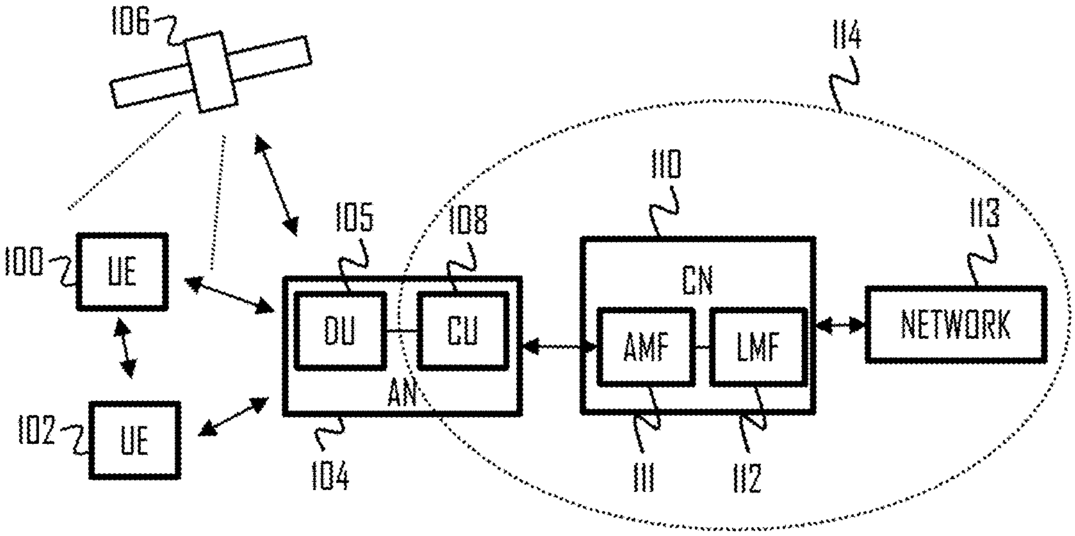

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The example embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a radio cell with an access node (AN) 104, such as an evolved Node B (abbreviated as eNB or eNodeB) or a next generation Node B (abbreviated as gNB or gNodeB), providing the radio cell. The physical link from a user device to an access node may be called uplink (UL) or reverse link, and the physical link from the access node to the user device may be called downlink (DL) or forward link. A user device may also communicate directly with another user device via sidelink (SL) communication. It should be appreciated that access nodes or their functionalities may be implemented by using any node, host, server or access point etc. entity suitable for such a usage.

A communication system may comprise more than one access node, in which case the access nodes may also be configured to communicate with one another over links, wired or wireless, designed for the purpose. These links may be used for signaling purposes and also for routing data from one access node to another. The access node may be a computing device configured to control the radio resources of communication system it is coupled to. The access node may also be referred to as a base station, a base transceiver station (BTS), an access point or any other type of interfacing device including a relay station capable of operating in a wireless environment. The access node may include or be coupled to transceivers. From the transceivers of the access node, a connection may be provided to an antenna unit that establishes bi-directional radio links to user devices. The antenna unit may comprise a plurality of antennas or antenna elements. The access node may further be connected to a core network 110 (CN or next generation core NGC). Depending on the deployed technology, the counterpart that the access node may be connected to on the CN side may be a serving gateway (S-GW, routing and forwarding user data packets), packet data network gateway (P-GW) for providing connectivity of user devices to external packet data networks, user plane function (UPF), mobility management entity (MME), or an access and mobility management function (AMF), etc.

With respect to positioning, the service-based architecture (core network) may comprise an AMF 111 and a location management function (LMF) 112. The AMF may provide location information for call processing, policy, and charging to other network functions in the core network and to other entities requesting for positioning of terminal devices. The AMF may receive and manage location requests from several sources: mobile-originated location requests (MO-LR) from the user devices and mobile-terminated location requests (MT-LR) from other functions of the core network or from other network elements. The AMF may select the LMF for a given request and use its positioning service to trigger a positioning session. The LMF may then carry out the positioning upon receiving such a request from the AMF. The LMF may manage the resources and timing of positioning activities. The LMF may use a Namf_Communication service on an NL1 interface to request positioning of a user device from one or more access nodes, or the LMF may communicate with the user device over N1 for UE-based or UE-assisted positioning. The positioning may include estimation of a location and, additionally, the LMF may also estimate movement or accuracy of the location information when requested. Connection-wise, the AMF may be between the access node and the LMF and, thus, closer to the access nodes than the LMF.

The user device illustrates one type of an apparatus to which resources on the air interface may be allocated and assigned, and thus any feature described herein with a user device may be implemented with a corresponding apparatus, such as a relay node.

An example of such a relay node may be a layer 3 relay (self-backhauling relay) towards the access node. The self-backhauling relay node may also be called an integrated access and backhaul (IAB) node. The IAB node may comprise two logical parts: a mobile termination (MT) part, which takes care of the backhaul link(s) (i.e., link(s) between IAB node and a donor node, also known as a parent node) and a distributed unit (DU) part, which takes care of the access link(s), i.e., child link(s) between the IAB node and user device(s), and/or between the IAB node and other IAB nodes (multi-hop scenario).

Another example of such a relay node may be a layer 1 relay called a repeater. The repeater may amplify a signal received from an access node and forward it to a user device, and/or amplify a signal received from the user device and forward it to the access node.

The user device may also be called a subscriber unit, mobile station, remote terminal, access terminal, user terminal, terminal device, or user equipment (UE) just to mention but a few names or apparatuses. The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, multimedia device, reduced capability (RedCap) device, wireless sensor device, or any device integrated in a vehicle.

It should be appreciated that a user device may also be a nearly exclusive uplink-only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable or wearable device with radio parts (such as a watch, earphones or eyeglasses) and the computation may be carried out in the cloud or in another user device. The user device (or in some example embodiments a layer 3 relay node) may be configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6

GHz-cmWave-mmWave). One of the concepts considered to be used in 5G networks may be network slicing, in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with one or more other networks 113, such as a public switched telephone network or the Internet, or utilize services provided by them. The communication network may also be able to support the usage of cloud services, for example at least part of core network operations may be carried out as a cloud service (this is depicted in FIG. 1 by “cloud” 114). The communication system may also comprise a central control entity, or the like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or a radio unit (RU), or an access node comprising radio parts. It is also possible that node operations may be distributed among a plurality of servers, nodes or hosts. Application of cloudRAN architecture enables RAN real-time functions being carried out at the RAN side (in a distributed unit, DU 105) and non-real time functions being carried out in a centralized manner (in a centralized unit, CU 108).

It should also be understood that the distribution of functions between core network operations and access node operations may differ from that of the LTE or even be non-existent. Some other technology advancements that may be used include big data and all-IP, which may change the way networks are being constructed and managed. 5G (or new radio, NR) networks may be designed to support multiple hierarchies, where MEC servers may be placed between the core and the access node. It should be appreciated that MEC may be applied in 4G networks as well.

5G may also utilize non-terrestrial communication, for example satellite communication, to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). A given satellite 106 in the mega-constellation may cover several satellite-enabled network entities that create on-ground cells. The on-ground cells may be created through an on-ground relay node or by an access node 104 located on-ground or in a satellite.

6G networks are expected to adopt flexible decentralized and/or distributed computing systems and architecture and ubiquitous computing, with local spectrum licensing, spectrum sharing, infrastructure sharing, and intelligent automated management underpinned by mobile edge computing, artificial intelligence, short-packet communication and blockchain technologies. Key features of 6G may include intelligent connected management and control functions, programmability, integrated sensing and communication, reduction of energy footprint, trustworthy infrastructure, scalability and affordability. In addition to these, 6G is also targeting new use cases covering the integration of localization and sensing capabilities into system definition to unifying user experience across physical and digital worlds.

It is obvious for a person skilled in the art that the depicted system is only an example of a part of a radio access system and in practice, the system may comprise a plurality of access nodes, the user device may have access to a plurality of radio cells and the system may also comprise other apparatuses, such as physical layer relay nodes or other network elements, etc. At least one of the access nodes may be a Home eNodeB or a Home gNodeB.

Furthermore, the access node may also be split into: a radio unit (RU) comprising a radio transceiver (TRX), i.e., a transmitter (Tx) and a receiver (Rx); one or more distributed units (DUs) that may be used for the so-called Layer 1 (L1) processing and real-time Layer 2 (L2) processing; and a central unit (CU) (also known as a centralized unit) that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the access node. The DU may be defined as a logical node hosting radio link control (RLC), medium access control (MAC) and/or physical (PHY) layers of the access node. The operation of the DU may be at least partly controlled by the CU. The CU may comprise a control plane (CU-CP), which may be defined as a logical node hosting the RRC and the control plane part of the PDCP protocol of the CU for the access node. The CU may further comprise a user plane (CU-UP), which may be defined as a logical node hosting the user plane part of the PDCP protocol and the SDAP protocol of the CU for the access node.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of functions between the above-mentioned access node units, or different core network operations and access node operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The access node(s) of FIG. 1 may provide any kind of these cells. A cellular radio system may be implemented as a multilayer network including several kinds of radio cells. In multilayer networks, one access node may provide one kind of a radio cell or radio cells, and thus a plurality of access nodes may be needed to provide such a network structure.

For fulfilling the need for improving the deployment and performance of communication systems, the concept of "plug-and-play" access nodes may be introduced. A network which may be able to use "plug-and-play" access nodes, may include, in addition to Home eNodeBs or Home gNodeBs, a Home Node B gateway, or HNB-GW (not shown in FIG. 1). An HNB-GW, which may be installed within an operator's network, may aggregate traffic from a large number of Home eNodeBs or Home gNodeBs back to a core network.

Positioning technologies may be used to estimate a physical location of a user device. Herein the user device to be positioned is referred to as a target UE or target user device. In wireless positioning, multiple positioning anchors in known locations may transmit and/or receive one or more positioning reference signals (PRS) to/from the target UE. In the uplink, a sounding reference signal (SRS) may be used as a positioning reference signal. For example, multilateration techniques may then be used to localize (i.e., position) the target UE with respect to the positioning anchors. The positioning anchors may also be referred to as anchors, anchor nodes, multilateration anchors, or reference points herein. The positioning anchors may be, for example, radio access nodes (in uplink/downlink positioning), transmission and reception points (TRP) (in uplink/downlink positioning), or other UEs (in sidelink positioning).

Sidelink (SL) positioning refers to the positioning approach, where the target UE utilizes the sidelink (i.e., the PC5 interface) to position itself, either in an absolute manner (in case of absolute positioning, where the coordinates of the target UE are obtained in the form of global or local Cartesian coordinates) or in a relative manner (in case of relative positioning, where the location of the target UE is estimated with respect to another entity, for example another non-static or anchor UE). For UE-assisted positioning, the target UE utilizes the sidelink to obtain positioning measurements and report the measurements to a network entity such as the location management function (LMF). Sidelink positioning may also be used to obtain ranging information. Ranging means determination of the distance and/or the direction between the target UE and another entity, such as an anchor UE.

Sidelink positioning involves the use of a supporting UE or a set of supporting UEs, referred to as the "anchor UE(s)", which assist(s) the positioning session of the target UE. The anchor UE support can be implemented in various ways, including the anchor UE(s) estimating the location of the target UE, the anchor UE(s) providing positioning assistance data to the target UE over sidelink, and/or the anchor UE(s) transmitting and/or receiving reference signals, such as a sidelink positioning reference signal (SL PRS), to/from the target UE for positioning purposes.

SL PRS is reference signal transmitted over sidelink for positioning purposes. SL PRS (pre-) configuration may comprise at least one of the (pre-) configured parameters of SL PRS, such as time-frequency resources including its bandwidth, periodicity, an identifier associated with sidelink positioning reference signal resource, and an identifier associated with a set of sidelink positioning reference signal resources (other parameters are not precluded).

For example, the following positioning techniques may be used in NR: downlink time difference of arrival (DL-TDOA), uplink time difference of arrival (UL-TDOA), downlink angle of departure (DL-AoD), uplink angle of arrival (UL-AoA), and/or multi-cell round trip time (multi-RTT). Both RAT-dependent as well as RAT-independent NR positioning techniques may be used. RAT is an abbreviation for radio access technology.

DL-TDOA and UL-TDOA have been introduced in NR Release 16 and further enhanced in NR Release 17. The DL-TDOA technique relies on measuring the reference signal time difference (RSTD) of DL positioning reference signals transmitted from multiple TRP locations, and the UL-TDOA technique relies on relative time of arrival (RTOA) measurement measured at multiple TRP locations, in order to perform trilateration and estimate the location of the target UE. One drawback of TDOA techniques is the need for tight synchronization between the TRPs in order to have high positioning accuracy.

As described above, DL-TDOA relies on the RSTD measurement, wherein the target UE measures the relative time of arrival to a reference. The reporting of this measurement in the NR Release 17 specifications (TS. 37.335) can be seen as:

```
NR-DL-TDOA-SignalMeasurementInformation-r16 ::= SEQUENCE {
    dl-PRS-ReferenceInfo-r16            DL-PRS-ID-Info-r16,
    nr-DL-TDOA-MeasList-r16               NR-DL-TDOA-MeasList-r16,
    ...
}
NR-DL-TDOA-MeasList-r16 ::= SEQUENCE (SIZE(1..nrMaxTRPs-r16)) OF NR-DL-
TDOA-MeasElement-r16
NR-DL-TDOA-MeasElement-r16 ::= SEQUENCE {
    dl-PRS-ID-r16                       INTEGER (0..255),
    nr-PhysCellID-r16                   NR-PhysCellID-r16           OPTIONAL,
    nr-CellGlobalID-r16                 NCGI-r15                    OPTIONAL,
```

-continued

| | | |
|---|---|---|
| nr-ARFCN-r16 | ARFCN-ValueNR-r15 | OPTIONAL, |
| nr-DL-PRS-ResourceID-r16 | NR-DL-PRS-ResourceID-r16 | OPTIONAL, |
| nr-DL-PRS-ResourceSetID-r16 | NR-DL-PRS-ResourceSetID-r16 | OPTIONAL, |

From the above, it can be seen that the measurement report for DL-TDOA relies on both dl-PRS-ReferenceInfo-r16 and the resource ID or resource set ID of another PRS.

The NR Release 16/17 positioning supported DL-TDOA technique based on DL PRS. The DL-TDOA technique may require the target UE to measure multiple RSTD measurements from multiple TRPs and/or cells, and it may need a single reference to calculate the RSTD. In NR Release 16/17, a single reference timing is determined based on a specific TRP, PRS resource set(s), and/or PRS resource(s).

In NR Release 18, the TDOA technique may be based on either or both of the SL PRS and DL PRS. However, the current specifications are not sufficient to support the hybrid of the sidelink time difference of arrival (SL-TDOA) technique, which may use RSTD measurement from SL PRS and DL PRS. Also, it is not sufficient to support SL-TDOA technique which may use RSTD measurement from two SL PRSs transmitted from two different UEs. These measurements may also be called SL RSTD measurements, TDOA measurements, or SL TDOA measurements. For example, without making any changes to the specifications, the target UE would not be able to use a SL PRS as the reference for RSTD measurements. As such, the target UE would report RSTD for DL PRS and then another RSTD for SL PRS. Without having the RSTD between the reference DL PRS and reference SL PRS, it may not be possible to use all the reported RSTD in one positioning estimation.

Some example embodiments may provide a configuration and reporting of the reference information of RSTD measurement to support TDOA based on DL PRS and SL PRS. The reference information may be needed to support DL-TDOA and the higher layer signaling "dl-PRS-ReferenceInfo-r16" introduced in NR Release 16.

Some example embodiments may provide support for SL-TDOA over SL PRS, and support for hybrid SL-TDOA over SL PRS and DL PRS.

It should be noted that RSTD may also be called TDOA, but for simplicity it is called RSTD herein.

Some example embodiments are described below using principles and terminology of 5G technology without limiting the example embodiments to 5G communication systems, however.

In some example embodiments, the target UE measures RSTD from a specific DL PRS resource and a SL PRS resource. The LMF may or may not configure the SL PRS resource. However, the target UE may use a different reference for RSTD than the one configured by the LMF, such that the target UE selects an anchor UE and SL PRS resource(s) transmitted from the anchor UE for the RSTD measurement report. Also, the target UE may be able to use one or multiple RSTD references and report the reference information.

In case the target UE uses a single RSTD reference, the LMF may run the location estimation algorithm with a single reference. The LMF may request the target UE to use a single RSTD reference for hybrid SL-TDOA from the SL-PRS and the DL-PRS resource(s). The LMF may indicate the target UE to use an RSTD reference from an anchor UE and/or SL PRS resource(s) transmitted from the anchor UE, which have a particular synchronization source, and other synchronization sources may not be allowed (e.g., an SL-UE using a gNB as its synchronization source may be allowed, but an SL-UE using the global navigation satellite system as its synchronization source may not be allowed). Herein the SL-UE may refer to the anchor UE transmitting the SL PRS that is used as the reference for the RSTD measurement. The target UE may report the used reference information that includes at least one of: a specific anchor UE ID, SL-PRS resource ID(s), synchronization source information of the anchor UE (e.g., cell ID or global navigation satellite system), a specific time stamp about transmitted SL-PRS resource ID(s) of the anchor UE, and/or the location of the anchor UE at the time stamp, if the target UE knows it. The LMF may need the time stamp to determine the location of the anchor UE at the specific time, if the target UE does not provide the location information of the anchor UE.

For example, the target UE may report reference information comprising at least one of: 1) an anchor UE ID, or 2) an anchor UE ID and SL-PRS resource ID(s) transmitted from the anchor UE. Furthermore, if one or more SL PRS resource sets are configured, the target UE may report reference information comprising at least the following: an anchor UE ID, an SL PRS resource set ID, and SL PRS resource ID(s), where the SL PRS resources are included in the SL PRS resource set and they are transmitted from the anchor UE. The reported reference information may further comprise the synchronization source information and/or the time stamp.

As an example, let us assume that the LMF requests the target UE to use an SL-UE with a synchronization source of a gNB #2 as an RSTD reference, and the synchronization source of the SL-UE (e.g., denoted as UE #1) is gNB #2. SL-UE with a synchronization source of a gNB #2 means that the SL-UE is synchronized to gNB #2. In this case, the target UE may report the following RSTD measurements: RSTD from TRP #1 and UE #1, RSTD from TRP #2 and UE #1, and RSTD from UE #2 and UE #1. Note that TRP #1 and/or TRP #2 may be in gNB #2 or in different gNBs. If these TRP #1 and TRP #2 are in gNB #1, the LMF may compensate for time synchronization error between gNB #1 and gNB #2 of the RSTD measurements. As RSTD reference information, the target UE may report at least one of: SL-PRS resource(s), ID of UE #1, and/or time stamp of the SL-PRS transmission from UE #1.

In case the target UE uses multiple RSTD references, the LMF may need to run the location estimation algorithm multiple times with different references. The UE may be allowed to use multiple RSTD references for hybrid SL-TDOA from the SL-PRS and the DL-PRS resource(s). The LMF may indicate the target UE to use one or multiple RSTD references from SL PRS resource(s), which have a specific synchronization source, but the LMF may provide a list of synchronization sources that are allowed for the RSTD reference. For example, SL-UE using PCI #1 and PCI #2 as a synchronization source may be allowed for RSTD reference. PCI is an abbreviation for physical cell identity. The target UE may report the used reference information that includes specific anchor UE ID(s), SL-PRS resource ID(s), synchronization source information of the anchor UEs (e.g., cell ID or global navigation satellite system), a specific time stamp about transmitted SL-PRS resource ID(s) of the anchor UE, and the location of the anchor UE at the time stamp, if the target UE knows it. The LMF may need the time stamp to determine the location of the anchor UE at the specific time, if the target UE does not provide the location information of the anchor UE. This reporting on the RSTD reference information may be reported in addition to the current reporting on the RSTD reference. For example, the target UE may be able to report two RSTD references, such that it may report TRP ID (e.g., TRP #1), PRS resource set ID(s), and/or PRS resource ID(s) by higher layer signaling (e.g., "dl-PRS-ReferenceInfo-r16"), and it may also report an ID of an anchor UE (e.g., ID of UE #1), SL-PRS resource ID(s), synchronization source information (e.g., cell ID), and time stamp. Note that this time stamp does not imply the measurement time for the DL PRS but implies the measurement time of the SL-PRS resource(s).

As an example, let us assume that the target UE measures the following RSTD measurements and reports them to the LMF, as described below with reference to FIG. 2.

Figure 2:
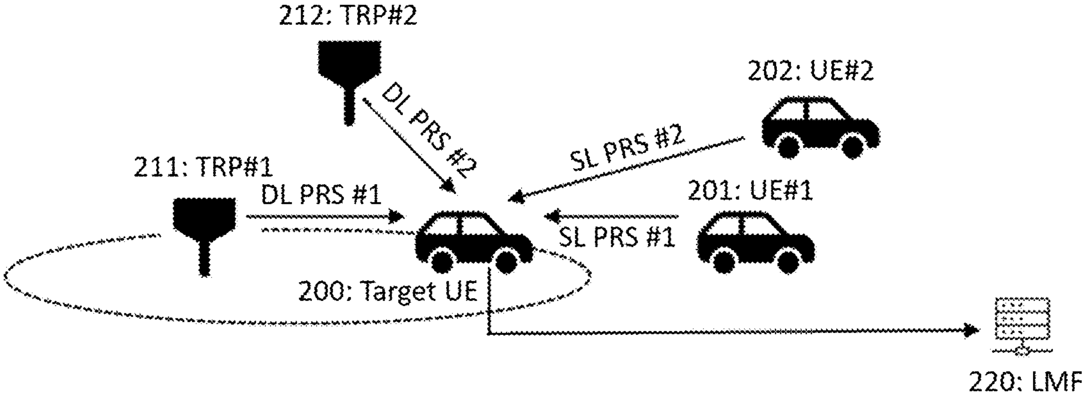
FIG. 2 illustrates an example of time difference of arrival from a sidelink positioning reference signal and a downlink positioning reference signal.

FIG. 2 illustrates an example of TDOA from SL PRS and DL PRS. In this example, a first TRP 211 (TRP #1) may transmit a first DL PRS (DL PRS #1) to a target UE 200. A second TRP 212 (TRP #2) may transmit a second DL PRS (DL PRS #2) to the target UE 200. A first UE 201 (UE #1) may transmit a first SL PRS (SL PRS #1) to the target UE 200. A second UE 202 (UE #2) may transmit a second SL PRS (SL PRS #2) to the target UE 200.

For example, the target UE 200 may use the first UE 201 (UE #1) and the second TRP 212 (TRP #2) as RSTD references for RSTD measurements. In this example, the target UE 200 may measure the following RSTD measurements and report them to the LMF 220: RSTD from the first TRP 211 (TRP #1) and the first UE 201 (UE #1), RSTD from the second TRP 212 (TRP #2) and the first UE 201 (UE #1), RSTD from the second UE 202 (UE #2) and the first UE 201 (UE #1), RSTD from the first TRP 211 (TRP #1) and the second TRP 212 (TRP #2), and RSTD from the second UE 202 (UE #2) and the second TRP 212 (TRP #2). TRP #1 and TRP #2 may be in the same gNB or in different gNBs.

For example, assume that the synchronization source of UE #1 is cell #1, and TRP #2 is located in cell #2. If the LMF knows the time synchronization information between cell #1 and cell #2, the LMF may modify the RSTD measurements so that they have a single reference timing.

In one example, the target UE may inform the LMF whether the reference was used only for RSTD measurement between DL PRS resources, or if the reference was also used for RSTD measurement between DL PRS and SL PRS.

On a further note, the target UE may report one or more of the anchor UE(s) as candidates for the RSTD reference to the LMF, and the target UE may suggest specific time-stamp(s) for the anchor UE to transmit SL PRS.

The LMF may need the location of the anchor UE at a specific time stamp, when the target UE measures the RSTD measurement from SL PRS transmitted from the anchor UE.

In case the LMF already has prior knowledge on the location of the anchor UE, or the target UE provides the location information of the anchor UE used as a reference, the target UE does not need to take any further action to obtain the location information of the anchor UE. Herein we may consider two options. Firstly, the LMF may indicate the anchor UE to perform UE-based positioning and to report its location information. Secondly, the LMF may try to estimate the location of the anchor UE. For example, the LMF may try to estimate the location of the anchor UE based on a RAT-independent technique or a RAT-dependent technique using DL PRS and/or UL SRS.

The LMF may indicate the anchor UE to measure DL PRS and transmit SL PRS within a specific (short) time considering the mobility of the target UE. For this purpose, the LMF may configure the anchor UE with a threshold value for a time difference between DL PRS reception and SL PRS transmission. In other words, the LMF may indicate the measurement behavior of the anchor UE: the anchor UE may measure DL PRS and transmit SL PRS within a configured time gap indicated by the threshold value.

Figure 3:
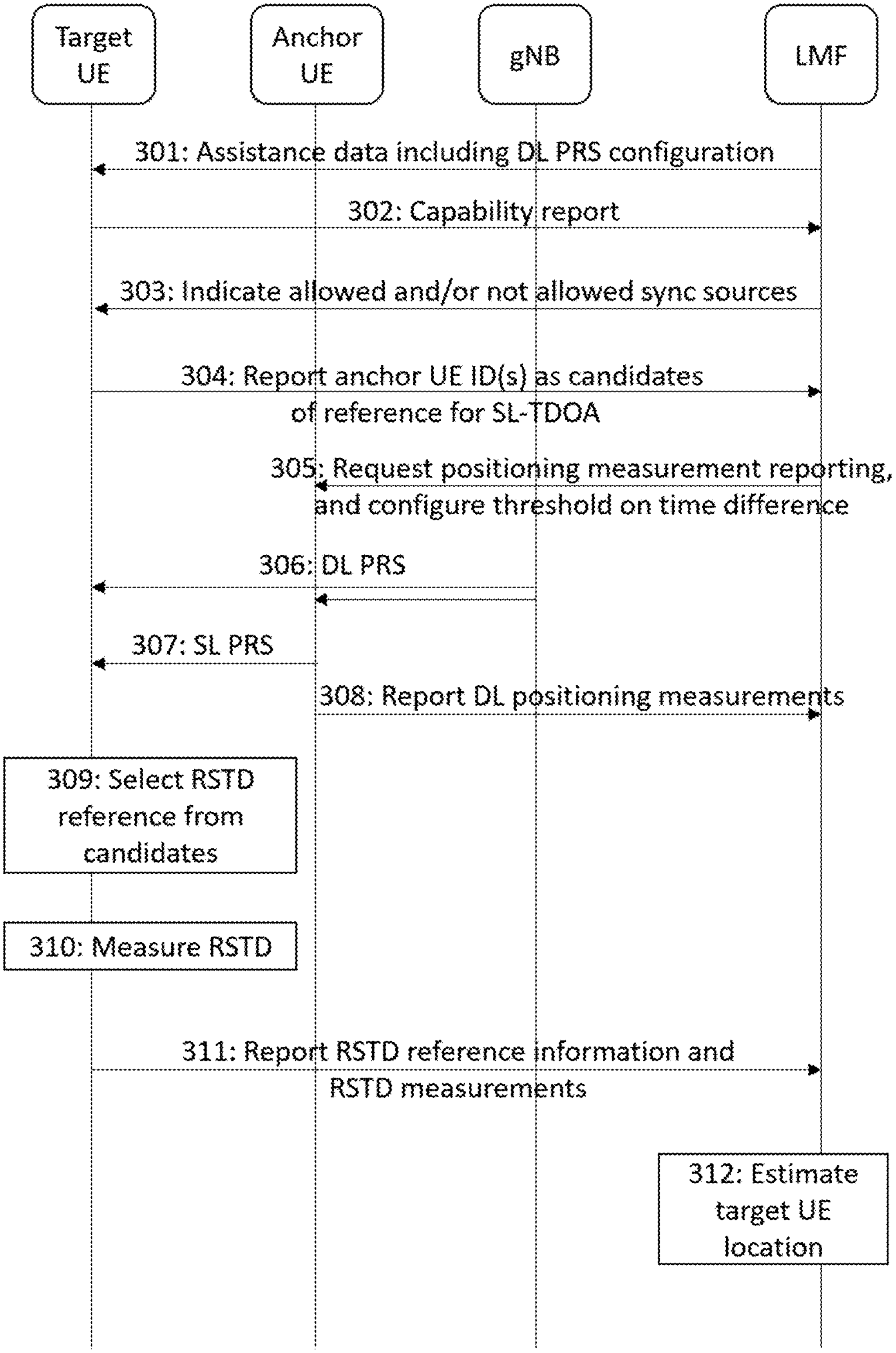
FIG. 3 illustrates a signaling diagram according to an example embodiment.

FIG. 3 illustrates a signaling diagram according to an example embodiment.

Referring to FIG. 3, in block 301, an LMF transmits, to a target UE, assistance data including a DL PRS resource configuration. The target UE may be involved in a SL-TDOA positioning session with one or more anchor UEs. The LMF may also be referred to as a network element of a core network.

The LMF may also provide the target UE with reference information by higher layer signaling, for example "dl-PRS-ReferenceInfo-r16" of the LTE positioning protocol (LPP). Based on the current LPP structure, the LMF may provide cell ID, TRP ID, PRS resource set ID(s), and PRS resource ID(s).

Alternatively, or additionally, the target UE and/or the one or more anchor UEs may be configured with a sidelink positioning reference signal (SL PRS) by gNB and/or LMF. The target UE and/or the one or more anchor UEs may be configured with candidate time-frequency resources for transmission and reception of the sidelink positioning reference signals by the gNB and/or LMF.

In block 302, the target UE transmits a capability report to the LMF. The capability report indicates at least whether the target UE supports sidelink positioning.

In block 303, the LMF transmits, to the target UE, an indication to use one or more references for SL-TDOA based on one or more allowed synchronization sources and/or one or more synchronization sources that are not allowed.

In other words, the LMF may indicate one or more allowed synchronization sources for the reference for RSTD measurement, and the anchor UE(s) that are using the one or more allowed synchronization sources may be considered as candidates for RSTD measurement.

Alternatively, or additionally, the LMF may indicate one or more synchronization sources that are not allowed for the reference, and the anchor UE(s) that are using these synchronization source(s) may not be considered as candidates for RSTD measurement.

For example, the LMF may indicate that anchor UEs using a gNB as a synchronization source are allowed as candidates for the reference, but anchor UEs using the global navigation satellite system (GNSS) as a synchronization source are not allowed as candidates for the reference.

The LMF may also indicate whether the target UE should use a single reference or multiple references for measuring the RSTD.

In block 304, the target UE reports, to the LMF, an identifier of one or more anchor UEs as candidates for the reference for SL-TDOA. In other words, the target UE reports, to the LMF, an identifier of one or more candidate UEs. The one or more candidate UEs may be synchronized to one of the one or more allowed synchronization sources. The one or more candidate UEs may not be synchronized to the one or more synchronization sources that are not allowed. The one or more candidate UEs may be anchor UEs (or supporting UEs or assistant UEs), which are used for SL positioning. The one or more candidate UEs may also be referred to as one or more candidate user devices herein.

In block 305, based on the identifier of the one or more candidate UEs, the LMF transmits, to the one or more candidate UEs, a request for positioning measurement reporting, and the LMF configures the one or more candidate UEs with a threshold value for a time difference between a time stamp for DL PRS reception and a time stamp for SL PRS transmission. For example, the time difference may be defined as follows: (time-stamp #1 for DL PRS reception)−(time stamp #2 for SL PRS transmission)<configured threshold. In other words, a given anchor UE may measure DL PRS and transmit SL PRS within the configured time gap indicated by the threshold value.

In block 306, a gNB (or a TRP connected to the gNB) transmits DL PRS to the target UE and to the one or more candidate UEs. Alternatively, the target UE and the one or more candidate UEs may receive DL PRS from different gNBs or TRPs.

In block 307, the one or more candidate UEs transmit SL PRS to the target UE.

In block 308, based on the request for the positioning measurement reporting, the one or more candidate UEs measure and report, to the LMF, their DL positioning measurements, which are based on the DL PRS received by a given anchor UE from the gNB (or TRP).

In block 309, the target UE decides, or selects, at least one anchor UE from the one or more candidate UEs as a reference for RSTD measurement.

In block 310, the target UE measures RSTD between at least two reference signals, wherein the at least two reference signals comprise at least an SL PRS received from the at least one anchor UE selected as the reference. The at least two reference signals may further comprise at least one of: a DL PRS received from a network element (e.g., gNB or TRP) of a radio access network, or an SL PRS received from another UE. In other words, the target UE may measure RSTD from a specific DL PRS resource and a SL PRS resource, or from two SL PRS resources from different anchor UEs.

In block 311, the target UE reports, to the LMF, the measured RSTD and reference information of the measured RSTD for example via the LTE positioning protocol (LPP). The reference information comprises at least one of: an identifier of the at least one anchor UE selected as the reference, an identifier of a resource associated with the SL PRS transmitted from the at least one anchor UE, synchronization source information of the at least one anchor UE, and/or a time stamp of the SL PRS transmitted by the at least one anchor UE. The target UE may also report a time stamp of the RSTD measurement. The measured RSTD and the reference information may be reported in the same report, or they may be reported separately.

The synchronization source information indicates at least one synchronization source used by the at least one anchor UE. For example, the synchronization source information may indicate at least one of: an access node such as a gNB, a NR cell ID (NCI), a physical cell identity, the physical cell identity and a synchronization signal block (SSB) identity, the physical cell identity and a transmission and reception point (TRP) identity, or a global navigation satellite system (GNSS).

The time stamp of the SL PRS received from the at least one anchor UE may indicate a reception time of the SL PRS at the target UE, or a transmission time of the SL PRS at the at least one anchor UE used as the reference.

The reference information may further comprise a location of the at least one anchor UE at the time stamp (i.e., the location at the time indicated by the time stamp), if the target UE knows the location.

If the RSTD was measured between DL PRS and SL PRS, then the report may indicate that the reference is valid for DL PRS and SL PRS. If the RSTD was measured between two SL PRSs, then the report may indicate that the reference is valid for SL PRS.

In block 312, the LMF estimates the location of the target UE based on the RSTD measurement(s) collected from the target UE and/or the DL positioning measurements provided by the at least one anchor UE.

In case the target UE uses a single RSTD reference, the LMF may run the location estimation algorithm with a single reference.

In case the UE uses multiple RSTD references, the LMF may need to run the location estimation algorithm multiple times with the different references.

Figure 4:
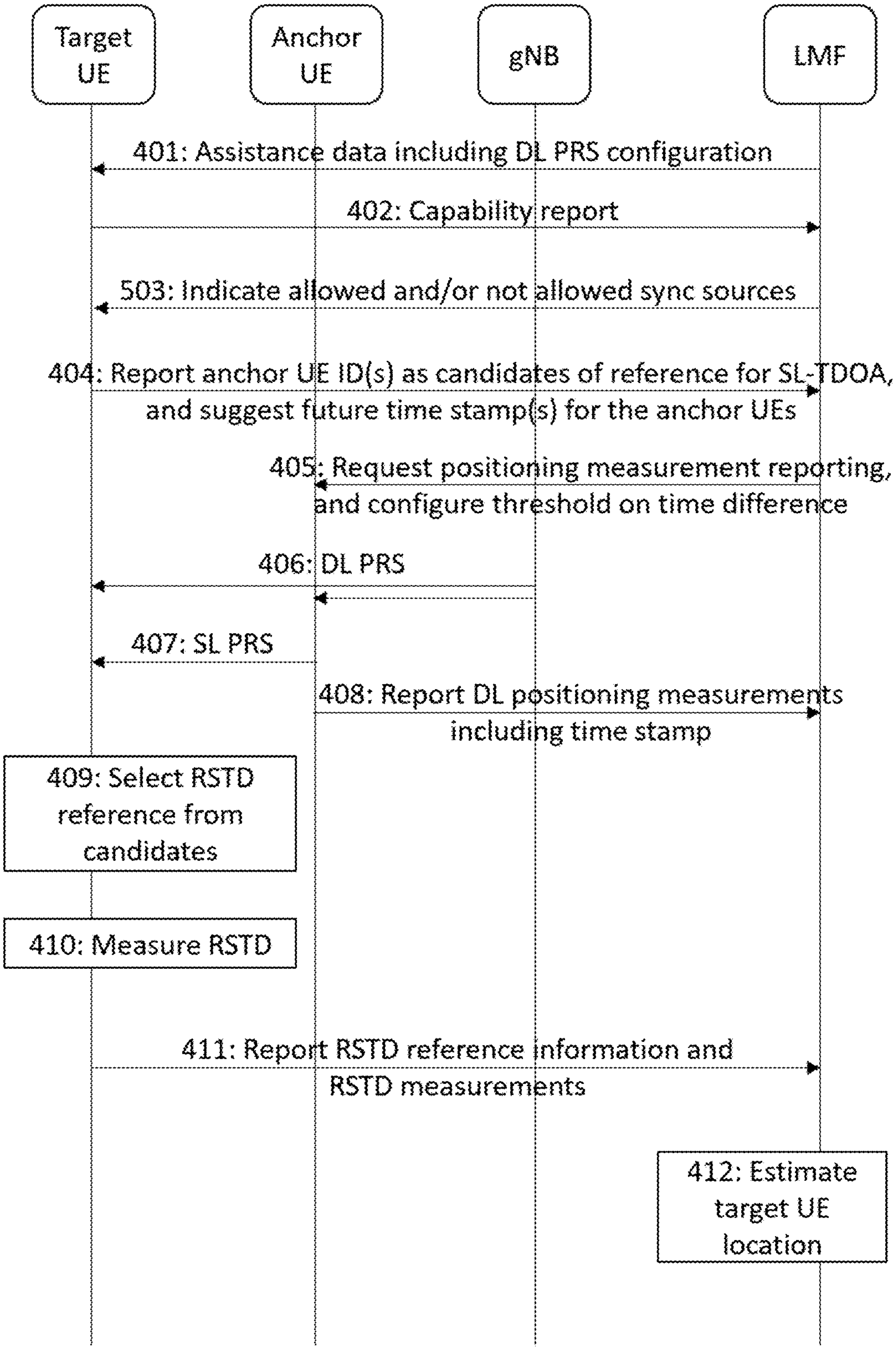
FIG. 4 illustrates a signaling diagram according to an example embodiment.

FIG. 4 illustrates a signaling diagram according to an example embodiment. In this example embodiment, the target UE may suggest time-stamp(s) for the anchor UE to measure DL PRS or transmit SL PRS at specific timing in the future. Based on the suggestion from the target UE, the LMF may request the anchor UE to measure DL PRS and/or transmit SL PRS at specific timing in the future.

Referring to FIG. 4, in block 401, an LMF transmits, to a target UE, assistance data including a DL PRS resource configuration. The target UE may be involved in a SL-TDOA positioning session with one or more anchor UEs. The LMF may also be referred to as a network element of a core network.

The LMF may also provide the target UE with reference information by higher layer signaling, for example "dl-PRS-ReferenceInfo-r16" of the LTE positioning protocol (LPP). Based on the current LPP structure, the LMF may provide cell ID, TRP ID, PRS resource set ID(s), and PRS resource ID(s).

Alternatively, or additionally, the target UE and/or the one or more anchor UEs may be configured with a sidelink positioning reference signal (SL PRS) by gNB and/or LMF. The target UE and/or the one or more anchor UEs may be configured with candidate time-frequency resources for transmission and reception of the sidelink positioning reference signals by the gNB and/or LMF.

In block 402, the target UE transmits a capability report to the LMF. The capability report indicates at least whether the target UE supports sidelink positioning.

In block 403, the LMF transmits, to the target UE, an indication to use one or more references for SL-TDOA that are included in the candidate UE(s) of one or more allowed synchronization sources.

In other words, the LMF may indicate one or more allowed synchronization sources for the reference for RSTD measurement, wherein the anchor UE(s) that are using the one or more allowed synchronization sources may be considered as candidates for RSTD measurement.

Alternatively, or additionally, the LMF may indicate one or more synchronization sources that are not allowed for the reference, wherein the anchor UE(s) that are using these synchronization source(s) may not be considered as candidates for RSTD measurement.

For example, the LMF may indicate that anchor UEs using a gNB as a synchronization source are allowed as candidates for the reference, but anchor UEs using GNSS as a synchronization source are not allowed as candidates for the reference.

The LMF may also indicate whether the target UE should use a single reference or multiple references for measuring the RSTD.

In block 404, the target UE reports, to the LMF, an identifier of one or more anchor UEs as candidates for the reference for SL-TDOA. In other words, the target UE reports, to the LMF, an identifier of one or more candidate UEs. The one or more candidate UEs may be synchronized to one of the one or more allowed synchronization sources. The one or more candidate UEs may not be synchronized to the one or more synchronization sources that are not allowed. The one or more candidate UEs may be anchor UEs (or supporting UEs or assistant UEs), which are used for SL positioning. The one or more candidate UEs may also be referred to as one or more candidate user devices herein.

The target UE may also transmit, to the LMF, one or more suggested future time stamps for measuring DL PRS at the one or more candidate UEs or transmitting SL PRS from the one or more candidate UEs. Alternatively, the target UE may transmit the one or more suggested future time stamps directly to the one or more candidate UEs via sidelink.

In block 405, based on the identifier of the one or more candidate UEs, the LMF transmits, to the one or more candidate UEs, a request for positioning measurement reporting, and the LMF configures the one or more candidate UEs with a threshold value for a time difference between a time stamp for DL PRS reception and a time stamp for SL PRS transmission. For example, the time difference may be defined as follows: (time-stamp #1 for DL PRS reception)−(time stamp #2 for SL PRS transmission)<configured threshold. In other words, a given anchor UE may measure DL PRS and transmit SL PRS within the configured time gap.

The LMF may also provide the one or more candidate UEs with one or more specific time stamps for measuring DL PRS or transmitting SL PRS at the time stamp(s). The one or more specific time stamps may be based on the one or more suggested future time stamps provided by the target UE. For example, the LMF may request the one or more candidate UEs to measure DL PRS or transmit SL PRS at the one or more suggested future time stamps.

In block 406, a gNB (or a TRP connected to the gNB) transmits DL PRS to the target UE and to the one or more candidate UEs. Alternatively, the target UE and the one or more candidate UEs may receive DL PRS from different gNBs or TRPs.

In block 407, the one or more candidate UEs transmit SL PRS to the target UE. The one or more candidate UEs may measure the DL PRS or transmit the SL PRS at a time indicated by at least one of the one or more time stamps requested by the LMF (or suggested by the target UE).

In block 408, based on the request for the positioning measurement reporting, the one or more candidate UEs measure and report, to the LMF, their DL positioning measurements, which are based on the DL PRS received by a given anchor UE from the gNB (or TRP).

In block 409, the target UE decides, or selects, at least one anchor UE from the one or more candidate UEs as a reference for RSTD measurement.

In block 410, the target UE measures RSTD between at least two reference signals, wherein the at least two reference signals comprise at least an SL PRS received from the at least one anchor UE selected as the reference. The at least two reference signals may further comprise at least one of: a DL PRS received from a network element (e.g., gNB or TRP) of a radio access network, or an SL PRS received from another UE. In other words, the target UE may measure RSTD from a specific DL PRS resource and a SL PRS resource, or from two SL PRS resources from different anchor UEs.

In block 411, the target UE reports, to the LMF, the measured RSTD and reference information of the measured RSTD for example via LPP. The reference information comprises at least one of: an identifier of the at least one anchor UE selected as the reference, an identifier of a resource associated with the SL PRS transmitted from the at least one anchor UE, synchronization source information of the at least one anchor UE, and/or a time stamp of the SL PRS transmitted by the at least one anchor UE. The target UE may also report a time stamp of the RSTD measurement. The measured RSTD and the reference information may be reported in the same report, or they may be reported separately.

The synchronization source information indicates at least one synchronization source used by the at least one anchor UE. For example, the synchronization source information may indicate at least one of: an access node such as a gNB, a NR cell ID (NCI), a physical cell identity, the physical cell identity and an SSB identity, the physical cell identity and a TRP identity, or GNSS.

The time stamp of the SL PRS received from the at least one anchor UE may indicate a reception time of the SL PRS at the target UE, or a transmission time of the SL PRS at the at least one anchor UE used as the reference.

The reference information may further comprise a location of the at least one anchor UE at the time stamp (i.e., the location at the time indicated by the time stamp), if the target UE knows the location.

If the RSTD was measured between DL PRS and SL PRS, then the report may indicate that the reference is valid for DL PRS and SL PRS. If the RSTD was measured between two SL PRSs, then the report may indicate that the reference is valid for SL PRS.

In block 412, the LMF estimates the location of the target UE based on the RSTD measurement(s) collected from the target UE and/or the DL positioning measurements provided by the at least one anchor UE.

In case the target UE uses a single RSTD reference, the LMF may run the location estimation algorithm with a single reference.

In case the UE uses multiple RSTD references, the LMF may need to run the location estimation algorithm multiple times with the different references.

Figure 5:
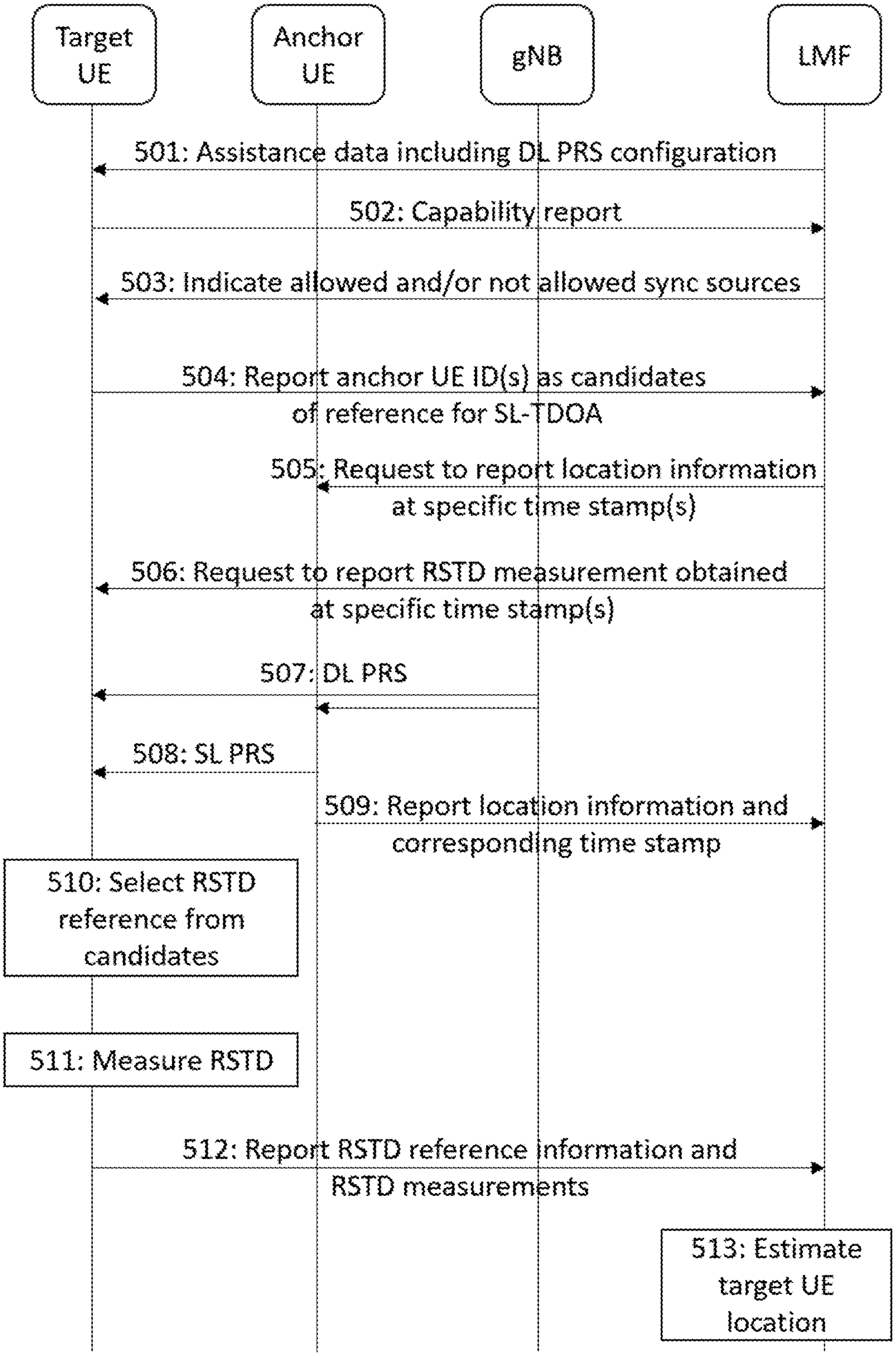
FIG. 5 illustrates a signaling diagram according to an example embodiment.

FIG. 5 illustrates a signaling diagram according to an example embodiment. In this example embodiment, the LMF requests the anchor UE to report its own location where it is at specific timing based on the UE-based positioning using a RAT-dependent or RAT-independent technique.

Referring to FIG. 5, in block 501, an LMF transmits, to a target UE, assistance data including a DL PRS resource configuration. The target UE may be involved in a SL-TDOA positioning session with one or more anchor UEs. The LMF may also be referred to as a network element of a core network.

The LMF may also provide the target UE with reference information by higher layer signaling, for example "dl-PRS-ReferenceInfo-r16" of the LTE positioning protocol (LPP). Based on the current LPP structure, the LMF may provide cell ID, TRP ID, PRS resource set ID(s), and PRS resource ID(s).

Alternatively, or additionally, the target UE and/or the one or more anchor UEs may be configured with a sidelink positioning reference signal (SL PRS) by gNB and/or LMF.

The target UE and/or the one or more anchor UEs may be configured with candidate time-frequency resources for transmission and reception of the sidelink positioning reference signals by the gNB and/or LMF.

In block 502, the target UE transmits a capability report to the LMF. The capability report indicates at least whether the target UE supports sidelink positioning.

In block 503, the LMF transmits, to the target UE, an indication to use one or more references for SL-TDOA that are included in the candidate UE(s) of one or more allowed synchronization sources.

In other words, the LMF may indicate one or more allowed synchronization sources for the reference for RSTD measurement, wherein the anchor UE(s) that are using the one or more allowed synchronization sources may be considered as candidates for RSTD measurement.

Alternatively, or additionally, the LMF may indicate one or more synchronization sources that are not allowed for the reference, wherein the anchor UE(s) that are using these synchronization source(s) may not be considered as candidates for RSTD measurement.

For example, the LMF may indicate that anchor UEs using a gNB as a synchronization source are allowed as candidates for the reference, but anchor UEs using GNSS as a synchronization source are not allowed as candidates for the reference.

The LMF may also indicate whether the target UE should use a single reference or multiple references for measuring the RSTD.

In block 504, the target UE reports, to the LMF, an identifier of one or more anchor UEs as candidates for the reference for SL-TDOA. In other words, the target UE reports, to the LMF, an identifier of one or more candidate UEs. The one or more candidate UEs may be synchronized to one of the one or more allowed synchronization sources. The one or more candidate UEs may not be synchronized to the one or more synchronization sources that are not allowed. The one or more candidate UEs may be anchor UEs (or supporting UEs or assistant UEs), which are used for SL positioning. The one or more candidate UEs may also be referred to as one or more candidate user devices herein.

In block 505, based on the identifier of the one or more candidate UEs, the LMF transmits, to the one or more candidate UEs, a request for measuring DL PRS at one or more specific time stamps and reporting the corresponding location information of the one or more candidate UEs to the LMF.

In block 506, the LMF transmits, to the target UE, a request to report the RSTD measurement obtained at the one or more specific time stamps. The one or more specific time stamps indicated to the target UE may be the same as the one or more specific time stamps indicated to the one or more candidate UEs.

In block 507, a gNB (or a TRP connected to the gNB) transmits DL PRS to the target UE and to the one or more candidate UEs. Alternatively, the target UE and the one or more candidate UEs may receive DL PRS from different gNBs or TRPs.

In block 508, the one or more candidate UEs transmit SL PRS to the target UE.

In block 509, based on the request to report the location information, the one or more candidate UEs report their location information and corresponding time stamp to the LMF. The location information indicates the location of a given candidate UE at the corresponding time stamp.

In block 510, the target UE decides, or selects, at least one anchor UE from the one or more candidate UEs as a reference for RSTD measurement.

In block 511, the target UE measures RSTD between at least two reference signals, wherein the at least two reference signals comprise at least an SL PRS received from the at least one anchor UE selected as the reference. The at least two reference signals may further comprise at least one of: a DL PRS received from a network element (e.g., gNB or TRP) of a radio access network, or an SL PRS received from another UE. In other words, the target UE may measure RSTD from a specific DL PRS resource and a SL PRS resource, or from two SL PRS resources from different anchor UEs. The measurement is performed at the one or more specific time stamps indicated by the LMF.

In block 512, the target UE reports, to the LMF, the measured RSTD and reference information of the measured RSTD for example via LPP. The reference information comprises at least one of: an identifier of the at least one anchor UE selected as the reference, an identifier of a resource associated with the SL PRS transmitted from the at least one anchor UE, synchronization source information of the at least one anchor UE, and/or a time stamp of the SL PRS transmitted by the at least one anchor UE. The target UE may also report a time stamp of the RSTD measurement. The measured RSTD and the reference information may be reported in the same report, or they may be reported separately.

The synchronization source information indicates at least one synchronization source used by the at least one anchor UE. For example, the synchronization source information may indicate at least one of: an access node such as a gNB, a NR cell ID (NCI), a physical cell identity, the physical cell identity and an SSB identity, the physical cell identity and a TRP identity, or GNSS.

The time stamp of the SL PRS received from the at least one anchor UE may indicate a reception time of the SL PRS at the target UE, or a transmission time of the SL PRS at the at least one anchor UE used as the reference.

If the RSTD was measured between DL PRS and SL PRS, then the report may indicate that the reference is valid for DL PRS and SL PRS. If the RSTD was measured between two SL PRSs, then the report may indicate that the reference is valid for SL PRS.

In block 513, the LMF estimates the location of the target UE based on the RSTD measurement(s) collected from the target UE and/or the location information provided by the at least one anchor UE.

In case the target UE uses a single RSTD reference, the LMF may run the location estimation algorithm with a single reference.

In case the UE uses multiple RSTD references, the LMF may need to run the location estimation algorithm multiple times with the different references.

Figure 6:
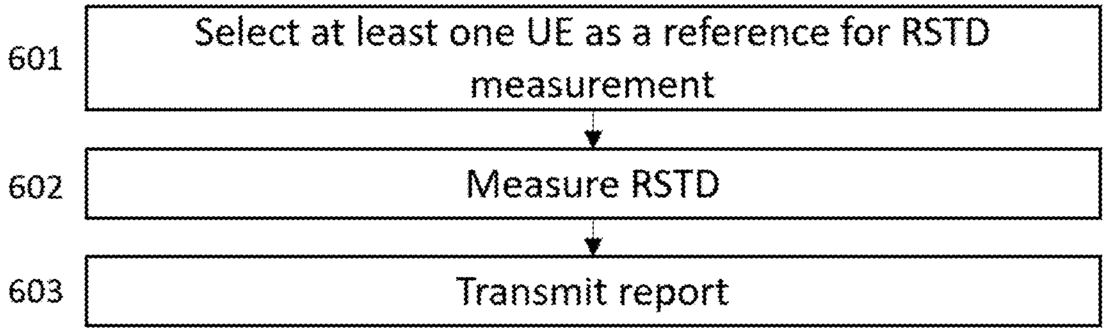
FIG. 6 illustrates a flow chart according to an example embodiment.

FIG. 6 illustrates a flow chart according to an example embodiment of a method performed by an apparatus such as, or comprising, or comprised in, a user device in a radio access network. The user device may also be called a subscriber unit, mobile station, remote terminal, access terminal, user terminal, terminal device, user equipment (UE), target UE, or target user device. The user device may correspond to the user device 100 of FIG. 1.

Referring to FIG. 6, in block 601, at least one user device is selected from one or more candidate user devices as a reference for reference signal time difference (RSTD) measurement.

In block 602, an RSTD is measured between at least two reference signals, wherein the at least two reference signals comprise at least a sidelink positioning reference signal (SL PRS) received from the at least one user device selected as the reference. For example, the at least two reference signals may further comprise at least one of: a downlink positioning reference signal received from a network element of the radio access network, or a sidelink reference signal received from another user device.

In block 603, a report is transmitted to a network element (e.g., LMF) of a core network, wherein the report comprises at least one of: an identifier of the at least one user device selected as the reference for the RSTD measurement, an identifier of a resource associated with the sidelink positioning reference signal received from the at least one user device, synchronization source information indicating at least one synchronization source of the at least one user device, or a time stamp of the sidelink positioning reference signal received from the at least one user device.

The apparatus may further transmit, to the network element of the core network, a measurement report indicative of the measured RSTD associated with the at least one user device selected as the reference for the RSTD measurement. The measurement report may be transmitted together with or separately from the report mentioned above.

Figure 7:
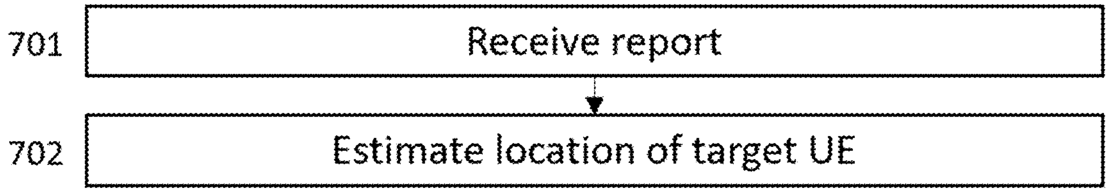
FIG. 7 illustrates a flow chart according to an example embodiment.

FIG. 7 illustrates a flow chart according to an example embodiment of a method performed by an apparatus such as, or comprising, or comprised in, a network element of a core network. The network element may correspond to the LMF 112 of FIG. 1.

Referring to FIG. 7, in block 701, a report is received from a target user device, wherein the report comprises at least one of: an identifier of at least one user device selected as a reference for measuring a reference signal time difference (RSTD), an identifier of a resource associated with a sidelink positioning reference signal (SL PRS) used for measuring the RSTD, synchronization source information indicating at least one synchronization source of the at least one user device selected as the reference for measuring the RSTD, or a time stamp of the sidelink positioning reference signal used for measuring the RSTD; and In block 702, a location of the target user device is estimated based at least partly on the report.

The apparatus may further receive, from the target user device, a measurement report indicative of the measured RSTD associated with the at least one user device selected as the reference for the RSTD measurement, wherein the location of the target user device may be estimated based at least partly on the measured RSTD. The measurement report may be received together with or separately from the report mentioned above.

Figure 8:
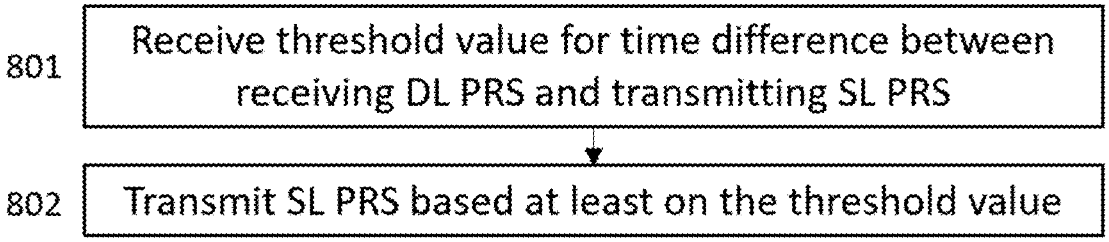
FIG. 8 illustrates a flow chart according to an example embodiment.

FIG. 8 illustrates a flow chart according to an example embodiment of a method performed by an apparatus such as, or comprising, or comprised in, a user device in a radio access network. The user device may also be called a subscriber unit, mobile station, remote terminal, access terminal, user terminal, terminal device, user equipment (UE), anchor UE, or anchor user device. The user device may correspond to the user device 102 of FIG. 1.

Referring to FIG. 8, in block 801, a threshold value is received from a network element (e.g., LMF) of a core network, wherein the threshold value is for a time difference between receiving a downlink positioning reference signal (DL PRS) and transmitting a sidelink positioning reference signal (SL PRS).

In block 802, the sidelink positioning reference signal is transmitted to a target user device based at least on the threshold value, wherein the time difference between receiving the downlink positioning reference signal and transmitting the sidelink positioning reference signal is less than the threshold value.

The blocks, related functions, and information exchanges (messages) described above by means of FIGS. 3-8 are in no absolute chronological order, and some of them may be performed simultaneously or in an order differing from the described one. Other functions can also be executed between them or within them, and other information may be sent, and/or other rules applied. Some of the blocks or part of the blocks or one or more pieces of information can also be left out or replaced by a corresponding block or part of the block or one or more pieces of information.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

In some example embodiments, the UE may be indicated by the network that DL PRS resource(s) can be used as the reference for the DL RSTD, DL PRS-RSRP, and UE Rx-Tx time difference measurements in a higher layer parameter nr-DL-PRS-ReferenceInfo. The reference indicated by the network to the UE can also be used by the UE to determine how to apply higher layer parameters nr-DL-PRS-ExpectedRSTD and nr-DL-PRS-ExpectedRSTD-Uncertainty. The UE expects the reference to be indicated whenever it is expected to receive the DL PRS. This reference provided by nr-DL-PRS-ReferenceInfo may include a dl-PRS-ID, a DL PRS resource set ID, and optionally a single DL PRS resource ID or a list of DL PRS resource IDs. The UE may use different DL PRS resources or a different DL PRS resource set to determine the reference for the RSTD measurement as long as the condition that the DL PRS resources used belong to a single DL PRS resource set is met. If the UE chooses to use a different reference than indicated by the network, then it is expected to report the dl-PRS-ID, the DL PRS resource ID(s) or the DL PRS resource set ID used to determine the reference. For the reported reference, the UE may report if this reference is valid only for the DL PRS or if it is also valid for DL PRS and SL PRS for the RSTD measurements. If the UE chooses to use a different reference than the indicated by the network, then it is expected to report a UE ID, SL PRS resource ID(s), synchronization source information of the UE, a time-stamp of the transmitted SL PRS resource ID(s). If a reference information for a RSTD measurement from SL PRS resource(s) and DL PRS resource(s) is not included in the report, the network may prioritize the nr-DL-PRS-ReferenceInfo to assume the reference of the RSTD measurement. The UE may be indicated by the network to use a single RSTD reference from SL PRS resource(s), which have a particular synchronization source, and the UE may be expected to report the used RSTD reference.

As an additional consideration, although the UE reports an RSTD reference, the reported RSTD reference may not be the reference for the reported RSTD measurements. For example, the UE can report TRP #1 and UE #1 as the references for RSTD measurements. If the UE is allowed to report RSTD from TRP #2 and UE #2 by the network, there may be a rule for the LMF to assume what the reference for the reported RSTD measurement is. In this case, one option is that the LMF assumes DL PRS as a RSTD reference rather than SL PRS.

In some example embodiments, it is possible for the LMF to configure just the current reference configuration (reference configuration for the DL-PRS), if the LMF does not have proper knowledge on the anchor UE. However, the target UE may still use an SL-UE as an SL-TDoA reference, and the target UE may replace the configured current reference with the SL-UE/SL-PRS for SL-TDOA.

The target UE may be allowed to use multiple references and report them. For example, if the LMF supports running a separate location estimation algorithm such as least square (LS) for a given reference, then it may allow using multiple RSTD references. Then, the target UE may have more flexibility to report RSTD measurements. For example, the UE may select one TRP and one anchor UE as the references, or it may select two different anchor UEs as the references. In addition, even if the target UE selects two references, the LMF may do further computation to effectively use a single reference. If the UE reports a specific TRP as a DL-TDOA reference and it reports an SL-UE as an SL-TDOA reference, but the TRP is in a gNB and the SL-UE could be synchronized to the same gNB.

Figure 9:
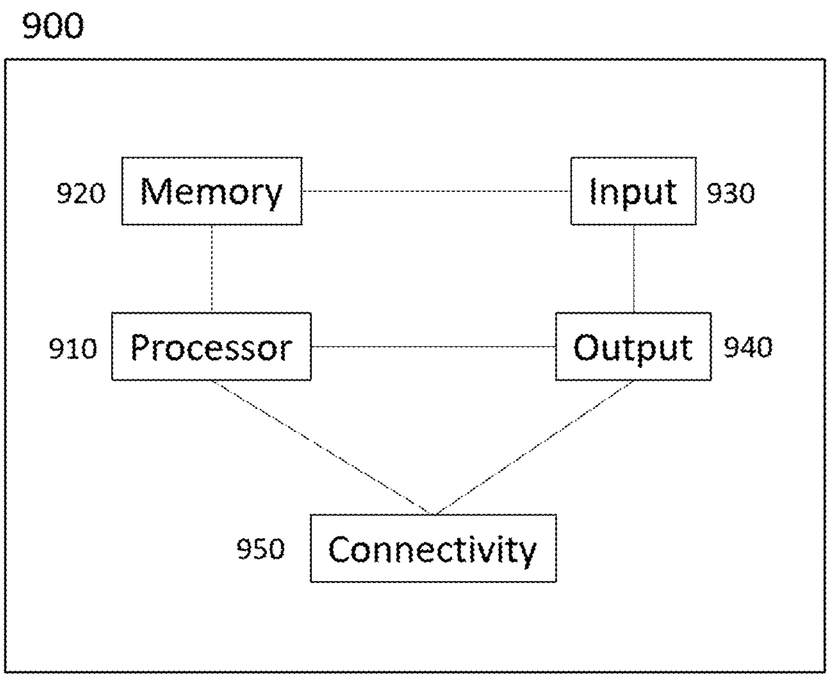
FIG. 9 illustrates an example of an apparatus.

FIG. 9 illustrates an example of an apparatus 900 in a radio access network, the apparatus comprising means for performing the method of FIG. 6, the method of FIG. 8, or any other example embodiment described above. For example, the apparatus 900 may be an apparatus such as, or comprising, or comprised in, a user device. The user device may correspond to one of the user devices 100, 102 of FIG. 1. The user device may also be called a subscriber unit, mobile station, remote terminal, access terminal, user terminal, terminal device, user equipment (UE), anchor UE, target UE, or target user device.

The apparatus 900 comprises at least one processor 910. The at least one processor 910 interprets computer program instructions and processes data. The at least one processor 910 may comprise one or more programmable processors. The at least one processor 910 may comprise programmable hardware with embedded firmware and may, alternatively or additionally, comprise one or more application-specific integrated circuits (ASICs).

The at least one processor 910 is coupled to at least one memory 920. The at least one processor is configured to read and write data to and from the at least one memory 920. The at least one memory 920 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The at least one memory 920 stores computer readable instructions that are executed by the at least one processor 910 to perform one or more of the example embodiments described above. For example, non-volatile memory stores the computer readable instructions, and the at least one processor 910 executes the instructions using volatile memory for temporary storage of data and/or instructions. The computer readable instructions may refer to computer program code.

The computer readable instructions may have been pre-stored to the at least one memory 920 or, alternatively or additionally, they may be received, by the apparatus, via an electromagnetic carrier signal and/or may be copied from a physical entity such as a computer program product. Execution of the computer readable instructions by the at least one processor 910 causes the apparatus 900 to perform one or more of the example embodiments described above. That is, the at least one processor and the at least one memory storing the instructions may provide the means for providing or causing the performance of any of the methods and/or blocks described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer. The term "non-transitory," as used herein, is a limitation of the medium itself (i.e., tangible, not a signal) as opposed to a limitation on data storage persistency (e.g., RAM vs. ROM).

The apparatus 900 may further comprise, or be connected to, an input unit 930. The input unit 930 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 930 may comprise an interface to which external devices may connect to.

The apparatus 900 may also comprise an output unit 940. The output unit may comprise or be connected to one or more displays capable of rendering visual content, such as a light emitting diode (LED) display, a liquid crystal display (LCD) and/or a liquid crystal on silicon (LCoS) display. The output unit 940 may further comprise one or more audio outputs. The one or more audio outputs may be for example loudspeakers.

The apparatus 900 further comprises a connectivity unit 950. The connectivity unit 950 enables wireless connectivity to one or more external devices. The connectivity unit 950 comprises at least one transmitter and at least one receiver that may be integrated to the apparatus 900 or that the apparatus 900 may be connected to. The at least one transmitter comprises at least one transmission antenna, and the at least one receiver comprises at least one receiving antenna. The connectivity unit 950 may comprise an integrated circuit or a set of integrated circuits that provide the wireless communication capability for the apparatus 900. Alternatively, the wireless connectivity may be a hardwired application-specific integrated circuit (ASIC). The connectivity unit 950 may comprise one or more components, such as: power amplifier, digital front end (DFE), analog-to-digital converter (ADC), digital-to-analog converter (DAC), frequency converter, (de) modulator, and/or encoder/decoder circuitries, controlled by the corresponding controlling units.

It is to be noted that the apparatus 900 may further comprise various components not illustrated in FIG. 9. The various components may be hardware components and/or software components.

Figure 10:
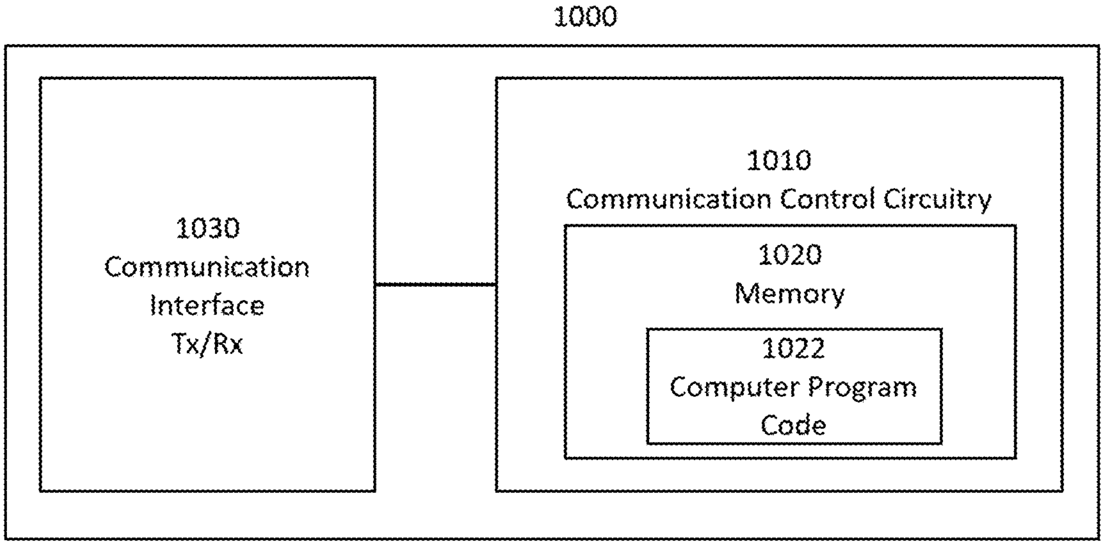
FIG. 10 illustrates an example of an apparatus.

FIG. 10 illustrates an example of an apparatus 1000 in a core network, the apparatus comprising means for performing the method of FIG. 7 or any other example embodiment described above. For example, the apparatus 1000 may be an apparatus such as, or comprising, or comprised in, a network element of a core network. The network element may correspond to the LMF 112 of FIG. 1. The network element may also be referred to, for example, as a network node or a location server.

The apparatus 1000 may comprise, for example, a circuitry or a chipset applicable for realizing one or more of the example embodiments described above. The apparatus 1000 may be an electronic device comprising one or more electronic circuitries.

The apparatus 1000 may comprise a communication control circuitry 1010 such as at least one processor, and at least one memory 1020 storing instructions which, when executed by the at least one processor, cause the apparatus 1000 to carry out one or more of the example embodiments described above. Such instructions may, for example, include a computer program code (software) 1022 wherein the at least one memory and the computer program code (software) 1022 are configured, with the at least one processor, to cause the apparatus 1000 to carry out one or more of the example embodiments described above. Herein computer program code may in turn refer to instructions which, when executed by the at least one processor, cause the apparatus 1000 to perform one or more of the example embodiments described above. That is, the at least one processor and the at least one memory storing the instructions may provide the means for providing or causing the performance of any of the methods and/or blocks described above.

The processor is coupled to the memory 1020. The processor is configured to read and write data to and from the memory 1020. The memory 1020 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The memory 1020 stores computer readable instructions that are executed by the processor. For example, non-volatile memory stores the computer readable instructions and the processor executes the instructions using volatile memory for temporary storage of data and/or instructions.

The computer readable instructions may have been prestored to the memory 1020 or, alternatively or additionally, they may be received, by the apparatus, via an electromagnetic carrier signal and/or may be copied from a physical entity such as a computer program product. Execution of the computer readable instructions causes the apparatus 1000 to perform one or more of the functionalities described above.

The memory 1020 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some example embodiments, structures of the frames used in the detected neighbour cells.

The apparatus 1000 may further comprise a communication interface 1030 comprising hardware and/or software for realizing communication connectivity according to one or more communication protocols. The communication interface 1030 comprises at least one transmitter (Tx) and at least one receiver (Rx) that may be integrated to the apparatus 1000 or that the apparatus 1000 may be connected to. The communication interface 1030 may comprise one or more components, such as: power amplifier, digital front end (DFE), analog-to-digital converter (ADC), digital-to-analog converter (DAC), frequency converter, (de) modulator, and/or encoder/decoder circuitries, controlled by the corresponding controlling units.

The communication interface 1030 provides the apparatus with radio communication capabilities to communicate in the cellular communication system. The communication interface may, for example, provide a radio interface to one or more user devices. The apparatus 1000 may further comprise another interface towards a core network such as the network coordinator apparatus or AMF, and/or to the access nodes of the cellular communication system.

It is to be noted that the apparatus 1000 may further comprise various components not illustrated in FIG. 10. The various components may be hardware components and/or software components.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of example embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the example embodiments described above, but may vary within the scope of the claims. Therefore, all words and expressions should be interpreted broadly, and they are intended to illustrate, not to restrict, the example embodiments.

The invention claimed is:

1. An apparatus in a radio access network, the apparatus comprising at least one processor, and at least one memory storing instructions which, when executed by the at least one processor, cause the apparatus at least to:

select at least one user device from a plurality of candidate user devices provided by the network as a reference for reference signal time difference (RSTD) measurements;

measure a plurality of RSTDs between at least two respective positioning reference signals and a sidelink positioning reference signal received from the at least one user device selected as the reference, wherein the plurality of RSTDs are measured relative to the same sidelink positioning reference signal received from the at least one user device selected as the reference; and transmit, to a network element of a core network, a report comprising:

an identifier of the at least one user device selected as the reference for the RSTD measurements, an identifier of a resource associated with the sidelink positioning reference signal received from the at least one user device, synchronization source information indicating at least one synchronization source of the at least one user device, a time stamp of the sidelink positioning reference signal received from the at least one user device, and a measurement report indicative of the plurality of measured RSTDs relative to the at least one user device selected as the reference for the RSTD measurements.

2. The apparatus according to claim 1, wherein the at least two respective positioning reference signals further comprise at least one of: a downlink positioning reference signal received from a network element of the radio access network, or a sidelink reference signal received from another user device.

3. The apparatus according to claim 2, wherein the report indicates that the reference is used for measuring the RSTD between the downlink positioning reference signal and the sidelink positioning reference signal received from the at least one user device selected as the reference.

4. The apparatus according to claim 1, wherein the synchronization source information indicates at least one of: an access node, a cell identity, a physical cell identity, the physical cell identity and a synchronization signal block identity, the physical cell identity and a transmission and reception point identity, or a global navigation satellite system.

5. The apparatus according to claim 1, wherein the time stamp of the sidelink positioning reference signal received from the at least one user device indicates a reception time of the sidelink positioning reference signal at the apparatus.

6. The apparatus according to claim 1, wherein the report further comprises a location of the at least one user device at the time stamp, wherein the at least one user device is selected as the reference.

7. The apparatus according to claim 1, further being caused to:

receive, from the network element of the core network, an indication indicating a plurality of allowed synchronization sources for the reference, wherein the plurality of candidate user devices are synchronized to at least one of the plurality of allowed synchronization sources.

8. The apparatus according to claim 1, further being caused to:

receive, from the network element of the core network, an indication indicating one or more synchronization sources that are not allowed for the reference, wherein the plurality of candidate user devices are not synchronized to the one or more synchronization sources that are not allowed.

9. The apparatus according to claim 1, further being caused to:

transmit, to the at least one user device or to the network element of the core network, one or more suggested time stamps for measuring a downlink positioning reference signal at the at least one user device or transmitting the sidelink positioning reference signal from the at least one user device.

10. The apparatus according to claim 1, further being caused to:

report, to the network element of the core network, an identifier of the plurality of candidate user devices.

11. The apparatus according to claim 1, further being caused to:

receive, from the network element of the core network, an indication to use a single reference for measuring the RSTD, wherein the at least one user device is selected based at least partly on the indication to use the single reference, the at least one user device comprising a single user device.

12. The apparatus according to claim 1, further being caused to:

receive, from the network element of the core network, an indication to use multiple references for measuring the RSTD, wherein the at least one user device is selected based at least partly on the indication to use the multiple references.

13. An apparatus in a core network, the apparatus comprising at least one processor, and at least one memory storing instructions which, when executed by the at least one processor, cause the apparatus at least to:

provide, to a target user device, a plurality of candidate user device for use as a reference for measuring a plurality of reference signal time difference (RSTD) measurements;

receive, from the target user device, a report comprising: an identifier of at least one user device selected from the plurality of candidate user devices as the reference for measuring the RSTD, an identifier of a resource associated with a sidelink positioning reference signal used for measuring the RSTD, synchronization source information indicating at least one synchronization source of the at least one user device selected as the reference for measuring the RSTD, a time stamp of the sidelink positioning reference signal used for measuring the RSTD, and a measurement report indicative of the plurality of measured RSTDs relative to the at least one user device selected as the reference for the RSTD measurements, wherein the plurality of measured RSTDs are measured relative to a same sidelink positioning reference signal received from the at least one user device selected as the reference for the RSTD measurements; and estimate a location of the target user device based at least partly on the report.

14. The apparatus according to claim 13, wherein the report indicates that the reference is used for measuring the RSTD between a downlink positioning reference signal and the sidelink positioning reference signal.

15. The apparatus according to claim 13, wherein the synchronization source information indicates at least one of: an access node, a cell identity, a physical cell identity, the physical cell identity and a synchronization signal block identity, the physical cell identity and a transmission and reception point identity, or a global navigation satellite system.

16. The apparatus according to claim 13, wherein the time stamp of the sidelink positioning reference signal indicates a reception time of the sidelink positioning reference signal at the target user device, or a transmission time of the sidelink positioning reference signal at the at least one user device.

17. The apparatus according to claim 13, wherein the report further comprises a location of the at least one user device at the time stamp, wherein the at least one user device is selected as the reference for measuring the RSTD.

18. The apparatus according to claim 13, further being caused to:

transmit, to the target user device, an indication indicating a plurality of allowed synchronization sources for the reference.

19. The apparatus of claim 13, wherein the apparatus is further caused to: receive, from the target user device, synchronization source information indicating at least one synchronization source of the at least one user device selected as the reference for measuring the RSTD.

* * * * *